March 11, 1958    W. H. KAGLEY ET AL    2,826,291
FRUIT GRIPPER FINGER ASSEMBLY FOR FRUIT PITTING MACHINE
Filed Oct. 17, 1955
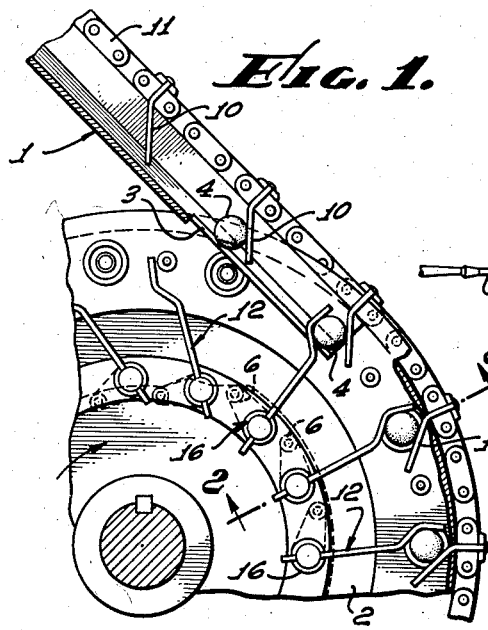
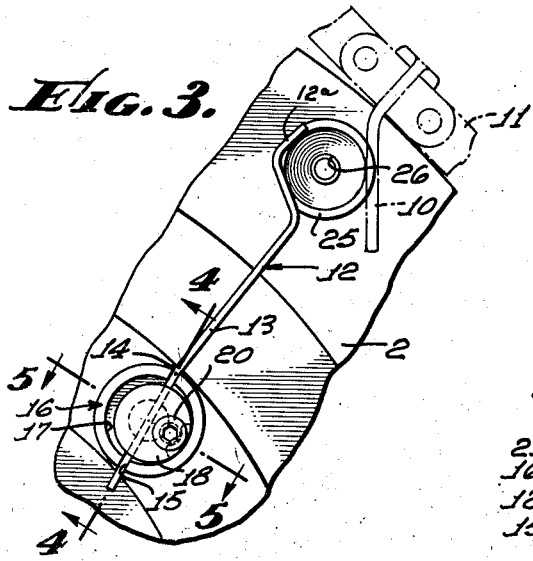
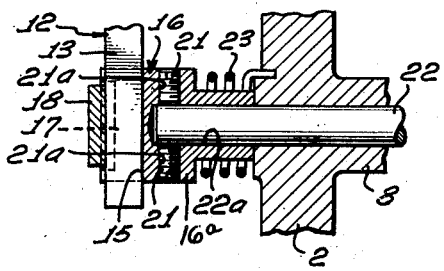
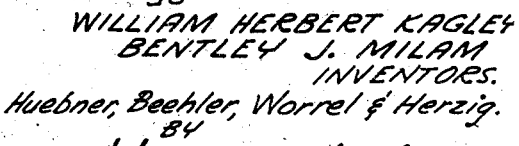
WILLIAM HERBERT KAGLEY
BENTLEY J. MILAM
INVENTORS.
Huebner, Beehler, Worrel & Herzig.
BY
Herbert A. Huebner
ATTORNEYS.

United States Patent Office 2,826,291
Patented Mar. 11, 1958

2,826,291

FRUIT GRIPPER FINGER ASSEMBLY FOR FRUIT PITTING MACHINE

William Herbert Kagley, Lindsay, and Bentley J. Milam, Strathmore, Calif., assignors to Lindsay Ripe Olive Company, Lindsay, Calif., a corporation of California Application October 17, 1955, Serial No. 540,747

4 Claims. (Cl. 198—167)

The present invention relates to a machine for pitting fruit, such as olives, and in particular to improvements over certain features of the invention described and claimed in United States patent of Edward P. Drake, Fred J. Alberty, and William H. Kagley, No. 2,341,857, granted February 15, 1944, for Fruit Pitting Machine.

In removing pits from olives by a machine of the type identified above, the olives are individually, firmly grasped in a predetermined, aligned position by gripper fingers and spacer members while a punch enters from one end of the olive and is forced longitudinally therethrough. During this operation, the olive is subjected to the mutual advance of a die and a punch. The olive pit is pushed out through the end of the olive into a bore extending into the die.

In processing different sizes or grades of olives, adjustments are made in the gripper fingers to accommodate the change in size of the olives to be pitted. It is desirable that these adjustments be capable of being made conveniently and in several directions so that the gripper fingers will engage the olives firmly but without injury thereto. Adjustments in the gripper fingers also may be necessary from time to time to compensate for wear in some parts of the machine. In addition, it is necessary in the course of time, to remove and replace some of the gripper fingers because of wear, breakage, or deterioration.

Accordingly, an important object of the invention is to provide gripper finger assemblies for fruit pitting machines that are capable of being conveniently and rapidly adjusted to accommodate fruits of different grades or sizes.

Another object is to provide a mounting for fruit gripper fingers for such a machine enabling the fingers to be rapidly and conveniently adjusted in several respects.

A further object is to provide an assembly for gripper fingers for such a machine providing for speedy and efficient removal and replacement of the fingers.

Other objects and advantages will appear from the further description in the specification and the illustrations in the drawing.

In the drawing:

Figure 1 is a fragmentary detail of parts borrowed from Figure 9 of the patent referred to above, No. 2,341,857, particularly illustrating the manner in which the olives are individually grasped firmly at the end of an olive chute in a predetermined aligned position by gripper fingers in cooperation with spacer members for advancement to the punch and die, but incorporating our new gripper finger assemblies.

Figure 2 is a fragmentary enlarged section taken on the line 2—2 of Figure 1.

Figure 3 is a fragmentary enlarged view showing a set of cooperating gripper fingers and spacer members of Figure 1 in position for firmly grasping an olive in alignment for pitting by the punch and die.

Figure 4 is a fragmentary section taken on the line 4—4 of Figure 3 showing particularly a mechanism for angular adjustment of a gripper finger.

Figure 5 is a fragmentary section taken on the line 5—5 of Figure 3 showing particularly a clamping plate mechanism for height adjustment of a gripper finger.

Figure 6 is a view (taken in the direction of the arrow 60) of the clamping plate of the mechanism shown in Figure 5.

In the fruit pitting machine described in the patent to which reference was made above, fruit, such as olives, is fed continuously to olive feeding chute means indicated at 1. Spacer or gripper members 10 are fastened to links of an endless chain 11 in spaced relationship, such as to every third link, and initially serve to space the individual olives 4 as they roll or slide downward in chute 1 toward a revolving drum 2.

As the olives 4 roll down chute 1 they seek their most natural rolling position. This position is rapidly assumed no matter what the position of each olive as it is fed into the chute. The olive invariably assumes a position with its longitudinal axis transverse of the chute 1 as it approaches drum 2.

A slot 3, cut through the bottom of chute 1 for a distance near its lower end, is not wide enough to affect the movement or position of the olives 4 but permits each of a plurality of narrow elongated gripper fingers 12 to enter behind each of the spaced, aligned olives and close in upon the same to grip the olive 4 between a gripper finger 12 and a spacer member 10, as shown.

The gripper fingers 12 are actuated by a cam race 5 acting on rollers 6. Connection is established between each gripper finger 12 and roller 6 by a crank 7 connected to a shaft 22 which, in turn, is connected to the head of a gripper finger holder 16. The shaft 22 is rotatably mounted in a bearing lug 8, which is one of a series positioned in the end of drum 2, in regularly spaced relationship with each other, and in concentric relationship with the axis of the drum.

A coil spring 23 is positioned upon the outer end portion of the shaft 22.

As the drum 2 rotates, carrying with it the gripper fingers 12, the rollers 6 on the cranks 7 follow the cam race 5. The gripper fingers 12 are held in a retracted, inactive position until reaching the slot 3 in the chute 1, at which point the cam race 5 recedes abruptly and in turn permits each spring 23 to urge a gripper finger 12 forward against an olive 4 which is following one of the spacers 10.

The endless chain 11 follows for a distance the contour of the drum 2, which forms part of the punch and die mechanism, and is supported on the peripheral track 9 formed on the inner end of the drum. Fragmentary views of a punch tip and a die member are indicated at 24 and 25, respectively, in Figure 2.

The gripper finger 12 and the spacer member 10, while gripping an olive 4 between them, travel together in this relationship in a circular path with rotating drum 2 approximately to the position where the olive is seized by the punch 24 and the die 25, whereupon the spacer member 10 travels on tangentially and the gripper finger is retracted by the action of roller 6 in cam race 5.

The punches 24 and dies 25 are mounted circumferentially in spaced relationship with respect to each other on each of two drums 2 (part of one is shown). Furthermore, the punches and dies are arranged on the cylindrical surfaces of the drums in alternating relationship. The drums 2, in turn, are rotatably mounted in axially spaced relationship with respect to each other so that the punches on one drum are positioned axially opposite the dies on the other drum, and the dies on the first mentioned drum are axially opposite the punches on the second mentioned drum. This is accomplished by orienting and rigidly connecting the two axially spaced drums so that they rotate together as a unit. A motor (not shown) and a gear train (not shown), connecting one of the drums 2 to the motor, are used to furnish the power for rotating the drums together as a unit.

During the continuous cyclic operation of the fruit pitting machine, the punch 24 enters the olive 4 from one end and is forced longitudinally therethrough. The punch forces the olive against the die 25 as the die also advances and the olive pit (not shown) is pushed out through the end of the olive, while the olive is supported by the die, into a longitudinal central bore 26 (Figure 3) extending into the die. The pit and the pitted olive are separately expelled from the fruit pitting machine and are collected in separate receptacles.

The gripper fingers 12 are made of a flat, resilient material, preferably metal. Each consists of a shank portion 13 and an upper end, or finger portion 12a, which is crooked to hook part-way around an olive. As each spacer member 10 approaches a finger 12, the latter is actuated to grasp an olive 4 between the spacer member and the crooked portion of the gripper finger, as previously described, and as shown in Figures 1 to 3. The shank portion 13 of gripper finger 12 is generally straight but preferably is bent at a slight angle at a point 14 displaced from the lower end of the shank.

The lower portion of each of the shanks 13 of the gripper fingers 12, is inserted in a slot 15 cut diametrically across the head 16a of a gripper finger holder 16. The head of each of the gripper finger holders 16 is circularly hollowed out at 17 to a depth made so that the outer side edge of a shank 13 disposed in a slot 15 projects above the surface of the bottom of the hollow 17. A preferably circular disc or plate 18, provided with an arcuate flange or spacer element 19 at a portion of the edge thereof, is clamped over the head of gripper finger holder 16 in the hollow 17 by a threaded stud 20. The stud 20 passes through a hole in the disc 18 and threadedly engages in a tapped hole in the face of head 16a, as best shown in Figure 5.

The shank 13 of a gripper finger 12 readily can be adjusted as to longitudinal spacing in slot 15 by loosening stud 20. The shank 13 is then free to slide in slot 15 for adjustment of the finger 12. After adjustment of the gripper finger 12 is accomplished to satisfactorily compensate for a different size or grade of olive, or for other purposes, the shank 13 is tightly clamped in slot 15 by tightening stud 20 to again clamp plate 18 against the shank of the gripper finger.

Axial and angular adjustments of a gripper finger 12 relative to the axis of the holder 16 is provided by set screws 21 threaded in tapped bores 21a in the holder head 16a, as best shown in Figure 4. These bores intersect an axial bore 22a in the holder head which receives the shaft 22. The set screws 21 engage, at their inner ends, the surface of the shaft 22 adjacent the end thereof. By loosening set screws 21, the holder head 16a, and the gripper finger 12, can be moved axially inward or outward on shaft 22, relative to the inner end of the drum 2, or it can be adjusted angularly by turning the holder head on shaft 22. After the desired in or out adjustment, or the desired angular adjustment, or both, have been made for the gripper finger 12, set screws 21 are tightened in the holder head to tightly engage shaft 22 and firmly fix the positioning of the gripper finger.

Thus, it will be seen that by means of the clamping plate 18 and the set screws 21 gripper fingers 12 can be readily removed or replaced and rapidly and efficiently adjusted to compensate for different grades or sizes of olives, or for other purposes, as for example, to rectify an improper set of the fingers. The adjustment of fingers 12 can be made both angularly and in a longitudinal direction. In addition, an axially in or out adjustment of the gripper fingers 12 on the shaft 22 can be made, which is desirable for machine alignment purposes.

While the instant invention has been shown and described herein in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

What we claim as our invention is:

1. A gripper mechanism for use in an article handling machine comprising an axially rockable shaft, a gripper holder comprising a head having an axial bore open at one end for mounting on the shaft, and a transverse slot at the other end for reception of a gripper finger, means coacting between the head and the shaft for rigidly but releasably fixing the head thereon at selected axial and rotational positions, an elongated gripper finger seated in the slot for free slidable positioning therein, means manually operable to rigidly but releasably clamp the finger in the slot at a selected position longitudinally of the finger, the slotted end of the head being axially recessed, and the means to clamp the finger in the slot comprising a plate placed at least partially in the recess, and a threaded stud binding the plate against the finger.

2. A gripper mechanism for use in an article handling machine comprising an axially rockable shaft, a gripper holder comprising a head having an axial bore open at one end for mounting on the shaft, and a transverse slot at the other end for reception of a gripper finger, means coacting between the head and the shaft for rigidly but releasably fixing the head thereon at selected axial and rotational positions, an elongated gripper finger seated in the slot for free slidable positioning therein, means manually operable to rigidly but releasably clamp the finger in the slot at a selected position longitudinally of the finger, the slotted end of the head being axially recessed, and the means to clamp the finger in the slot comprising a plate placed at least partially in the recess, a spacer element interposed between the plate and the bottom wall of the recess transversely spaced from the finger, and a threaded stud binding the plate against the finger.

3. A gripper mechanism for use in an article handling machine comprising an axially rockable shaft, a gripper holder comprising a head having an axial bore open at one end for mounting on the shaft, and a transverse slot at the other end for reception of a gripper finger, means coacting between the head and the shaft for rigidly but releasably fixing the head thereon at selected axial and rotational positions, an elongated gripper finger seated in the slot for free slidable positioning therein, means manually operable to rigidly but releasably clamp the finger in the slot at a selected position longitudinally of the finger, the means coacting between the head and the shaft for fixing the head comprising a set screw in the head engaging the shaft, the slotted end of the head being axially recessed, and the means to clamp the finger in the slot comprising a plate placed at least partially in the recess, a spacer element interposed between the plate and the bottom wall of the recess transversely spaced from the finger, and a threaded stud binding the plate against the finger.

4. A gripper mechanism for use in an article handling machine comprising a rockable shaft, a gripper finger holder comprising a head having an axial bore open at one end for mounting on an end of the shaft, and a transverse groove extending across the other end for reception of a gripper finger, an elongated gripper finger seated in the groove for free slidable positioning therein, and releasable means carried by said head and bearing upon said finger outwardly of said groove and pressing the same inwardly of said groove to frictionally clamp the finger against the bottom of said groove.

References Cited in the file of this patent

UNITED STATES PATENTS

| | | |
|---|---|---|
| 2,025,371 | Beidler | Dec. 24, 1935 |
| 2,341,857 | Drake et al. | Feb. 15, 1944 |